(No Model.)
J. A. MURPHY.
PNEUMATIC TIRE.
No. 580,884. Patented Apr. 20, 1897.
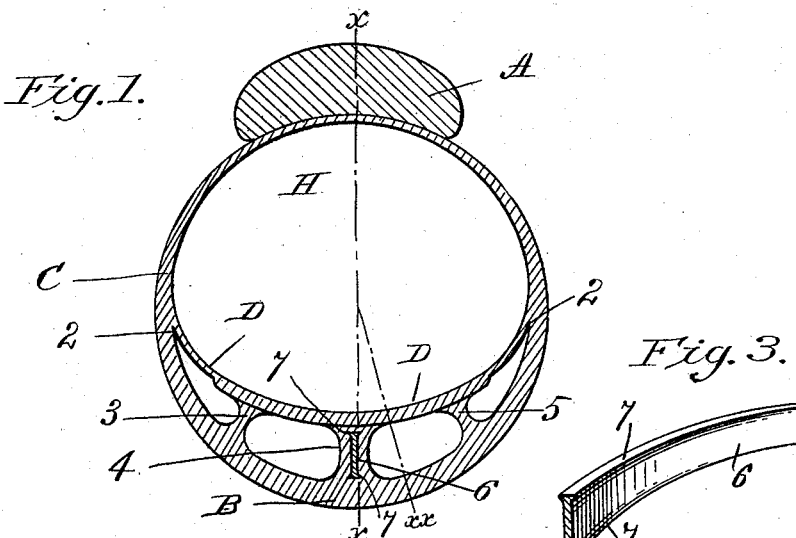
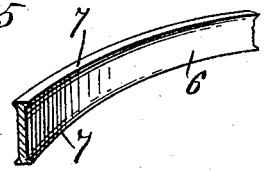
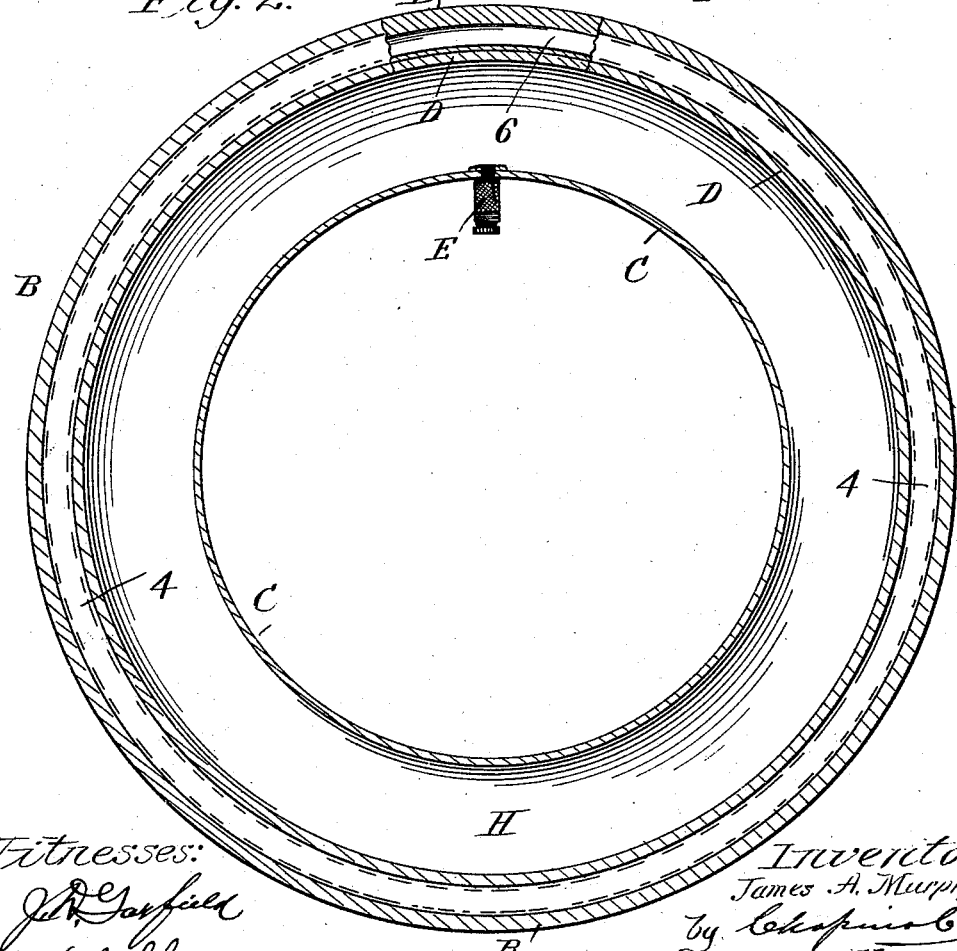
Witnesses:
J. D. Garfield
K. J. Clemons
Inventor
James A. Murphy,
by Chapin & Co.
Attorneys.
THE NORRIS PETERS CO., PHOTO-LITHO., WASHINGTON, D. C.

UNITED STATES PATENT OFFICE.

JAMES A. MURPHY, OF HOLYOKE, MASSACHUSETTS, ASSIGNOR OF ONE-HALF TO CHARLES H. MORGAN, OF SAME PLACE.

PNEUMATIC TIRE.

SPECIFICATION forming part of Letters Patent No. 580,884, dated April 20, 1897.

Application filed August 14, 1896. Serial No. 602,702. (No model.)

*To all whom it may concern:*

Be it known that I, JAMES A. MURPHY, a citizen of the United States of America, residing at Holyoke, in the county of Hampden and State of Massachusetts, have invented new and useful Improvements in Pneumatic Tires, of which the following is a specification.

This invention relates to elastic tires for vehicles, and more especially to that class known as "pneumatic" tires; and the object of the invention is to lessen the liability of the inner tube to puncture by providing a separating-space between the air-tube and the tread side of the tire; and a further object of the invention is to reinforce the outer tube; and the invention consists in the construction described and claimed in the following specification.

In the drawings forming part of this specification, Figure 1 is a cross-sectional view through the rim of the wheel and the tire. Fig. 2 is a section taken through the tire at a right angle to the section shown in Fig. 1, partly on line $x\ x$ and partly on line $x$. Fig. 3 is a view of a portion of the reinforcing-ring in the outer tube.

Referring to the drawings, A represents the rim of a wheel, and B the tread part of a pneumatic tire C. Said tire is tubular and is constructed in the usual manner and provided with the valve E and is divided transversely by a diaphragm D, of resilient material, whose edges are cemented to the sides of said tire C at 2 2, or said diaphragm may be made as of one piece with said tire, being molded therein in the process of manufacture thereof.

On the tread side of the tire C, and molded onto the interior surface thereof, are three ribs 3, 4, and 5, radially disposed relative to the center of the said tire. These ribs extend around the entire length of the tire, and the two side ribs 3 and 5 are made, preferably, of less height than the center rib 4 for the purpose of affording a broader support for that part of the diaphragm bearing against the edges of the ribs 3, 4, and 5 when the tire is inflated. The said rib 4, on which comes the most weight, is made wider and higher than the side ribs 3 and 5, and it has embedded in it a reinforcing-ring 6, as shown in the drawings. Said ring is made, preferably, of metal and is endless, and not only imparts great rigidity to the said rib 4, but also serves to distribute the deflection of the tire at the point of contact of said tire with the earth. It is obvious that without said reinforcing-ring the portion of the tire at the point of contact thereof with the surface on which it is being used would flatten out under the weight of the rider, if used on a bicycle, and materially increase the friction between said tire and said surface, said flattening taking place because of the lack of rigidity in the ribs 3, 4, or 5. If said ribs were made of such dimensions as would be necessary to support the required weight without the aid of said ring 6, the tire would be of such weight as to be unsalable, but a thin metal ring, as 6, so distributes the deflection of the tire at the point of its contact with the earth, as stated, as to overcome the above-mentioned undesirable qualities and yet permits the tire to be made as light as is consistent with safety. If desired, that part of the diaphragm resting on the edges of the ribs may be made thicker than at that part thereof secured to the inner surface of the tire. Such an increase in thickness is shown in Fig. 1.

The transversely-located diaphragm in the tire C and that part of said tire between that and the rim A constitute the air-receptacle H of the said tire, which may be inflated through the valve, as usual, the said ribs serving to hold the diaphragm D at such a distance away from the tread part of said tire as to render the puncturing of said tire practically impossible, and the ribs 3, 4, and 5 are of sufficient rigidity to distend the tread part of the tire with great force when the air-receptacle H has been forcibly inflated. If desired, the said reinforcing-ring 6 may be made with edges, as 7, (see Fig. 3,) of greater width than the body of the ring in order to lessen the liability of the ring to cut into the resilient material composing the tire and ribs and for imparting greater rigidity thereto.

Having thus described my invention, what I claim, and desire to secure by Letters Patent, is—

1. A pneumatic tire for vehicles consisting of a single tube having therein a flexible diaphragm united by its edges to said tube, a series of radially-disposed continuous ribs forming part of said tube, and located between the tread part of said tire and said diaphragm, and a reinforcing metal ring embedded in one of said ribs in the plane of the greatest diameter of said tire, substantially as described.

2. A pneumatic tire for vehicles consisting of a single tube divided longitudinally by a flexible diaphragm into two parts, one of said parts constituting an air-receptacle for holding air under pressure and provided with a suitable valve, the other of said parts provided with several radially-disposed continuous ribs for supporting said diaphragm, and a reinforcing-ring located edgewise in one of said ribs in the plane of the greatest diameter of said tire, substantially as described.

3. A pneumatic tire for vehicles consisting of a single tube divided longitudinally by a flexible diaphragm into two parts one of said parts constituting an air-receptacle for holding air under pressure, and provided with a suitable valve, the other of said parts provided with several radially-disposed continuous ribs for supporting said diaphragm, and a reinforcing-ring located edgewise in one of said ribs in the plane of the greatest diameter of said tire, the edges of said rib being wider than the body thereof, substantially as described.

JAMES A. MURPHY.

Witnesses:
H. A. CHAPIN,
WM. H. CHAPIN.